United States Patent
Du et al.

(10) Patent No.: US 12,108,773 B2
(45) Date of Patent: Oct. 8, 2024

(54) METHOD OF PRODUCING FERMENTED NON-DAIRY FROZEN CONFECTIONERY

(71) Applicant: SOCIETE DES PRODUITS NESTLE S.A., Vevey (CH)

(72) Inventors: Juan Du, Shanghai (CN); Christoph Josef Bolten, Martigny (CH); Liang Wei Wilson Lee, Singapore (SG); Nilesh Desai, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 587 days.

(21) Appl. No.: 17/299,905

(22) PCT Filed: Dec. 2, 2019

(86) PCT No.: PCT/EP2019/083296
§ 371 (c)(1),
(2) Date: Jun. 4, 2021

(87) PCT Pub. No.: WO2020/114961
PCT Pub. Date: Jun. 11, 2020

(65) Prior Publication Data
US 2022/0022489 A1  Jan. 27, 2022

Related U.S. Application Data

(60) Provisional application No. 62/775,600, filed on Dec. 5, 2018.

(51) Int. Cl.
*A23G 9/36* (2006.01)
*A23G 9/08* (2006.01)
(Continued)

(52) U.S. Cl.
CPC ............... *A23G 9/363* (2013.01); *A23G 9/08* (2013.01); *A23G 9/34* (2013.01); *A23G 9/42* (2013.01);
(Continued)

(58) Field of Classification Search
CPC .................. A23G 9/363; A23G 9/42
See application file for complete search history.

(56) References Cited

U.S. PATENT DOCUMENTS 4,335,155 A   6/1982  Blake et al.
5,989,598 A   11/1999 Whalen et al.
(Continued)

FOREIGN PATENT DOCUMENTS

CN   103209596 A   7/2013
CN   104754953 A   7/2015
(Continued)

OTHER PUBLICATIONS

Chinese Office Action for Chinese Appl No. 201980079318.4 dated Jun. 10, 2023.

*Primary Examiner* — Jenna A Watts
(74) *Attorney, Agent, or Firm* — K&L Gates LLP

(57) ABSTRACT

The present invention relates to a method of producing a non-dairy frozen confectionery, the method comprising the steps of: 1) providing a grain based ingredient mix comprising plant syrup and having 20-40 wt. % solids, pasteurizing the grain based ingredient mix, fermenting the pasteurized grain based mix with a culture, and cooling the fermented grain ingredient based ingredient mix, and 2) providing a nut and/or seed based ingredient mix comprising 40-60 wt. % solids and 3) combining it with the cooled fermented grain based ingredient mix, and freezing while optionally aerating the combined grain and nut and/or seed based mixes, to form a frozen confectionery. The invention (Continued)

also relates to a non-dairy frozen confectionery comprising 3-20 wt. % grain fermented with *Streptococcus thermophilus,* and 4-40 wt. % seed and/or nuts.

18 Claims, 5 Drawing Sheets

(51) Int. Cl.
    *A23G 9/34*     (2006.01)
    *A23G 9/42*     (2006.01)
(52) U.S. Cl.
    CPC ...... *A23G 2200/02* (2013.01); *A23G 2200/14* (2013.01)

(56) References Cited

U.S. PATENT DOCUMENTS

| | | |
|---|---|---|
| 2006/0078651 A1 | 4/2006 | Esghipour |
| 2006/0141097 A1* | 6/2006 | Guo ................... A23C 11/10 426/61 |
| 2008/0299253 A1* | 12/2008 | Rabault ............... A23G 9/42 426/43 |
| 2010/0104725 A1 | 4/2010 | D'Agostino et al. |
| 2013/0287874 A1* | 10/2013 | Mercenier ........... A61P 29/00 424/780 |
| 2015/0289538 A1* | 10/2015 | Ummadi .............. A23G 9/04 426/583 |
| 2020/0029613 A1* | 1/2020 | Schimoler ........... A23L 33/185 |

FOREIGN PATENT DOCUMENTS

| | | | |
|---|---|---|---|
| EP | 0970614 | 1/2000 | |
| FR | 2789854 | 8/2000 | |
| WO | 9842200 A1 | 10/1998 | |
| WO | 2009063458 | 5/2009 | |
| WO | 2017001265 | 1/2017 | |
| WO | 2017001266 | 1/2017 | |
| WO | 2017001267 | 1/2017 | |
| WO | WO-2017001265 A1 * | 1/2017 | ............ A23G 9/327 |
| WO | 2017093005 | 6/2017 | |

* cited by examiner

Fermented oat-cashew frozen confectionery
Process flow chart

Oat flour (OF)
Corn syrup 36 DE(GS)

METHOD OF PRODUCING FERMENTED NON-DAIRY FROZEN CONFECTIONERY

CROSS REFERENCE TO RELATED APPLICATIONS

The present application is a National Stage of International Application No. PCT/EP2019/083296, filed on Dec. 2, 2019, which claims priority to U.S. Provisional Patent Application No. 62/775,600, filed on Dec. 5, 2018, the entire contents of which are being incorporated herein by reference.

FIELD OF THE INVENTION

The present invention relates to a method of producing a non-dairy frozen confectionery comprising plant based ingredient mixes.

BACKGROUND

The plant-based food market is currently one of the fastest growing segment in the industry, mainly driven by concerns over health and environment sustainability. Recently, there has been numerous plant-based variants of conventional meat, dairy, ice cream products available in the market manufactured with raw materials like soy, pea, rice and oat. Oat is positively perceived amongst consumers with numerous associated health benefits such as prebiotic, anti-diabetic effects and reduced cardiovascular disease risks linked to the presence of high levels of dietary fibre and active phytochemicals.

However, the application of plant-based raw materials in various product categories remains very challenging due to the off-flavours, which are either inherent or generated along the value chain (beany, green, bitter, cereal, and astringent).

Furthermore, issues with textural and functional properties arise when utilizing plant materials. Therefore, developing plant-based variants for product categories, i.e. ice cream/frozen desserts, where taste and texture are the key criteria for product quality, is challenging.

Frozen confections which have a smooth and creamy texture are highly appreciated by consumers. This also applies to the category of non-dairy frozen confection.

Conventional ice creams are made from a combination of milk products, including cream, butter, butterfat, or milk in one of its various forms: whole fluid milk, evaporated milk, skim milk, condensed milk, sweetened dried milk, or dried skim milk. These milk products, for the most part, contain various concentrations of lactose and cannot be digested by lactase deficient persons or by consumers who wish to avoid dairy products for other reasons.

Typically milk proteins and fats in dairy based frozen confection help create smooth and creamy texture of frozen confection. This is in particular the case for a super-premium product, where high amount of protein and fats are used. In the absence of dairy ingredients, there is a critical need to use added stabilizers and emulsifiers to deliver a smooth and creamy texture. Normally stabilizers are gums from various sources and emulsifiers are mono and di-glycerides, egg yolks, lecithin etc.

US 2010119683 discloses a process for preparing a frozen dessert for soft serve-ice cream having stabilized ice crystals to imitate the taste of ice cream. The process comprises selection of ingredients from a group including coconut milk and coconut meat, to which both a freeze inhibitor and a stabilizer are added.

U.S. Pat. No. 4,643,906 discloses a non-dairy milk and cream substitutes which comprise a water and oil emulsion. The non-dairy emulsion consists of a homogenized blend of vegetable, emulsifier, stabilizer, protein, and water. The vegetable oil may be coconut oil.

Fermentation is known in frozen confection in the preparation of frozen yoghurt. Commercially available frozen yoghurt is generally manufactured with a process comprising two streams: a fermented mix stream and a non-fermented mix stream. Lower solids (below 20 wt. %) is present in the fermented streams due to the growth limitation of yoghurt culture microorganisms while the non-fermented steam contains the reminder of higher amount of solids (40-50 wt. %) than the fermented mix stream.

However, it has been found that using commercial yogurt culture to ferment the plant material such as oat flour, causes a lot acidic taste. The use of grain in such products is thus limited due to off flavour. Furthermore, granule structure of starch, and non-hydrophilic proteins from the grain may cause coarse texture and non-smooth mouthfeel.

Furthermore, it has been found that processing plant based ingredient mixes for frozen confection is difficult due to high levels of starch and protein which may gel before, during and after pasteurization.

There is therefore a need for a process for making non-dairy frozen confection which avoids the problem of gelling of the ingredients.

There is a need for non-dairy frozen confectionery using grain while having a limited off flavour grain e.g. oats, while having a pleasant texture.

Non-dairy products on the market today are known to be high in calories. There is a need for lower calories and better nutritional profile non-dairy frozen confectionery.

There is a need to provide a frozen confectionery being non-dairy and which overcomes one or more of the above mentioned drawbacks.

OBJECT OF THE INVENTION

It is thus the object of the present invention to provide frozen confectionery which overcomes one or more of the above-mentioned drawbacks.

SUMMARY OF THE INVENTION

The present invention provides the improvement of a non-dairy confectionery process by a particular method which ferments grain with plant syrup and culture, before combining it with a nut and/or seed based ingredient mix.

In a first aspect, the invention relates to a method of producing a non-dairy frozen confectionery, the method comprising the steps of:
1) providing a grain based ingredient mix comprising plant syrup and having 20-40 wt. % solids,
   pasteurizing the grain based ingredient mix,
   fermenting the pasteurized grain based mix with a culture, and
   cooling the fermented grain based ingredient mix, and
2) providing a nut and/or seed based ingredient mix comprising 40-60 wt.% solids and
3) combining it with the cooled fermented grain based ingredient mix, and
   freezing while optionally aerating the combined grain and nut and/or seed based mixes, to form a frozen confectionery.

It has been found that a fermentation according to the invention removes the green notes and provides a creamy flavour and better texture. Furthermore, it does not provide strong acidic taste which is the result of fermentation of plant material with commercial yogurt cultures.

A selected group of strains have been found to work, while a number of other strains do not provide the desired effect.

High solids based cereal products are generally difficult to process in particular in an ice cream due to the pasteurization, which will increase the viscosity of the mix and block the process. It has been found that by using syrup instead of sugar, it is possible to increase the solids, and thus also the grain content in the product. This allows for lower calories and better nutritional profile non-dairy frozen confectionery to be made.

Furthermore, it has been found that the fermentation reduced the gelling of the cereal. For example, it has been found that the gelling of oat flour has been substantially reduced.

When processing plant based ingredient mixes for frozen confectionery this is difficult due to high levels of starch and protein which may gel before, during and after pasteurization and cooling. It has been found that starches causes difficulties during the pasteurisation process and will cause the pasteurization equipment to shut down due to blockage.

In confectionery products, lipid materials are required to stabilize air bubbles during freezing process and storage condition. Natural grain flours, such as whole oat flour contains iron which is a good source of nutrient, however, the iron from oat flour can also promote lipid oxidization during fermentation process, in which mix has been heated at temperature higher than ambient for hours.

Therefore, in this invention, it has been found that by using two separated mix process: the fermented grain liquid mix which involves pasteurization, fermentation, cooling process; the non-fermented nut and/or seed mix, which involves pasteurization, cooling, aging as optional process. This allows the lipids-rich portion of the mix and the iron-containing grain mix to be kept separated and avoid oxidization. Thus, in a preferred embodiment of method according to the invention, the seeds and/or nuts based ingredient mix is not fermented.

The product according to the invention may comprise live culture/probiotics and due to the fermentation. Furthermore, the cereal taste of the grain, e.g. oat has been masked.

It is also possible to obtain a frozen confectionery product, which is significantly lower in calories and has better nutritional profile compared with current non-dairy coconut products on the market. Fermentation can deliver complex flavours that can help with the reduction of sugar/calories together with reformulation of the product recipe.

It has furthermore, been found that low pH of grain based ingredient mix to fermentation may cause airy and non-smooth texture of the product. To improve the texture, vegetable oil may be used. Additionally, emulsifier may be used to increase the smoothness and air holding capacity in the frozen confectionery e.g. in coconut and cashew products.

In a second aspect, the invention relates to a frozen confectionery obtained with the method described in the claims.

In a further aspect, the invention relates to a non-dairy frozen confectionery comprising
    3-20 wt. %, preferably 8-15 wt. % grain fermented with *Streptococcus thermophilus,* and
    4-40 wt. %, preferably 8-35 wt. % seed and/or nuts.

The seed and/or nuts in the non-dairy frozen confection according to the invention are preferably in the form of seed and/or nut cream or butter. In a preferred embodiment of the non-dairy frozen confectionery, the seeds and/or nuts are not fermented.

DETAILED DESCRIPTION OF THE INVENTION

Figure 1:
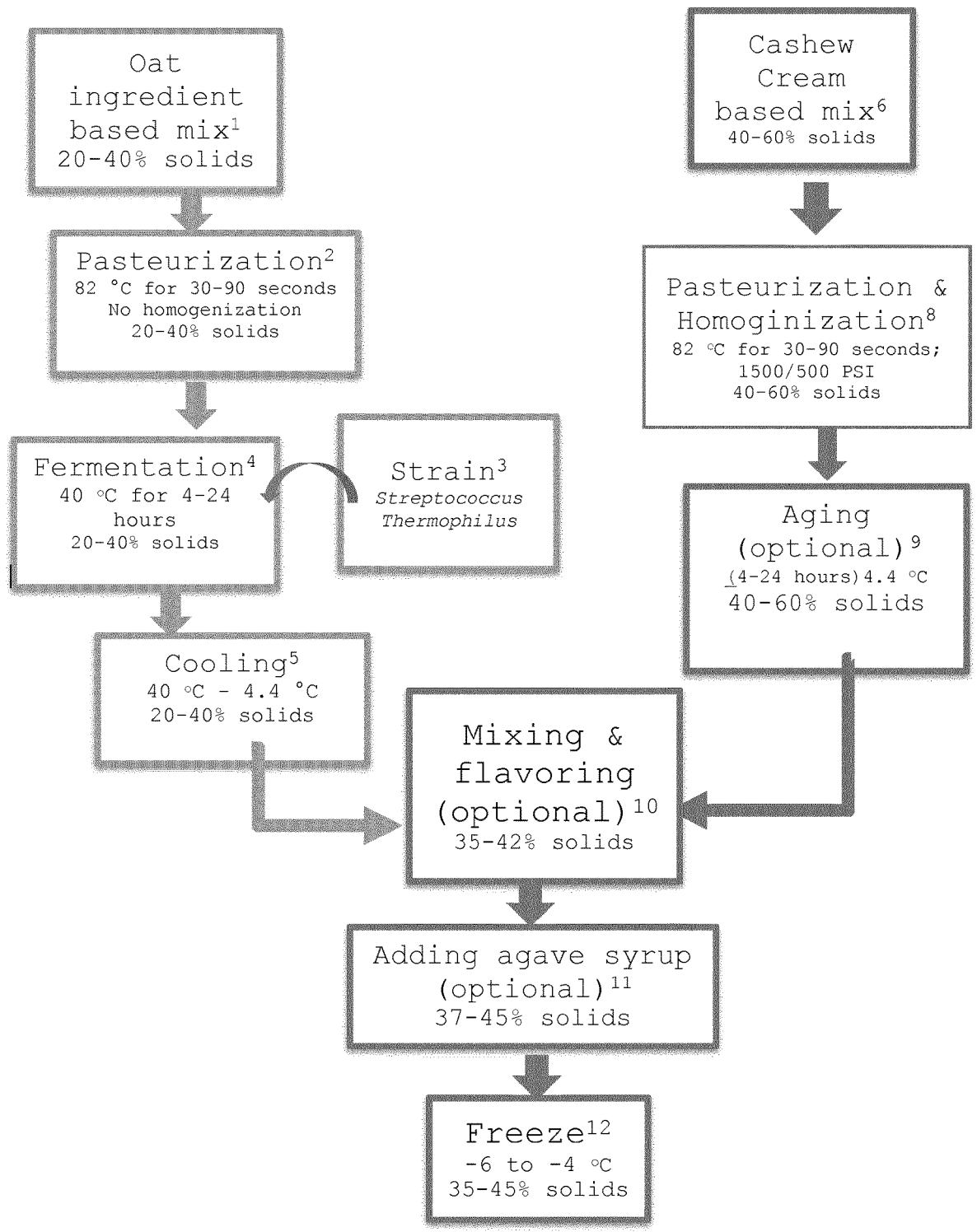
FIG. 1 shows a process diagram for a method of making fermented oat with coconut cream frozen confection.

Non-hydrolysed grain material does not contain easily fermentable simple sugars, which can support the growth of added starter culture.

Addition of plant syrup, has been found to provide an easily accessible source of carbon to starter cultures avoiding the needs to hydrolyse starches from the grain materials.

In the present context, the plant syrup is a blend of simple fermentable sugars, and might also contain longer chain polysaccharides.

The dextrose equivalence (DE) of such syrups typically range from 20-50. The range of plant sources for making this syrup include but not limited to: tapioca, corn, sweet potato, yam, potato, rice, brown rice, barley, oat, birch, fruits, chocolate, yacon, sorghum, cane or a combination thereof.

Further. Structured carbohydrates such as polydextrose, soluble corn fiber etc., which also contains a component of simple fermentable sugar can be used as plant syrups for the fermentation purpose of the present invention.

The plant syrup is added as a fermentable carbon source, and does not typically contribute to the sweetness in the final products.

Further, in the present context unless otherwise indicated % of a component means the % of weight based on the weight of the total composition, i.e. weight/weight %.

In the present context, "frozen confection" or "frozen confectionery" means a product such as ice cream, sorbet, mellorine, milk shake, any frozen dessert etc.

In the present context, the term "sugars" in this document will be defined as a mixture of mono- and di-saccharides. For example sucrose, glucose, fructose, maltose are sugars according to this definition. Sugars may also include low caloric mono- and di-saccharides, sugar alcohols, natural and/or artificial intense sweeteners. Moreover, the term "sugar" will be defined as sucrose or common sugar.

The sugar is preferably selected from the group consisting of sucrose, dextrose, maltose, glucose or a combination thereof.

The sugar may advantageously be in the form of syrup e.g. corn or cereal syrup or glucose syrup. Sugar could also be added in the form of powder, crystalline or in granular form According to the invention, the fermentation is with a culture. It has surprisingly been found that when the culture is *Streptococcus thermophilus*, green notes are removed and creamy flavour provided while also a better texture is obtained. In a particular preferred embodiment of the method of the invention the culture is *Streptococcus thermophilus* is selected from the group consisting of *Streptococcus thermophilus* NCC 2019: CNCM I-1422 and *Streptococcus thermophilus* NCC 2496: CNCM I-3915.

*Streptococcus thermophilus* CNCM I-1422, also named NCC 2019 was deposited with the Collection Nationale de Cultures de Microorganismes (CNCM), Institut Pasteur, 25 rue du Docteur Roux, F-75724 PARIS Cedex 15, France, on 18 May 1994 and given the deposit number I-1422.

*Streptococcus thermophilus* CNCM I-3915, also named NCC 2496 was deposited with the Collection Nationale de Cultures de Microorganismes (CNCM), Institut Pasteur, 25 rue du Docteur Roux, F-75724 PARIS Cedex 15, France, on 5 Feb. 2008 and given the deposit number I-3915.

In one embodiment of the invention the culture is added in an amount of 0.005-2 wt. %, more preferably 0.01-0.5 wt. %, to the grain based ingredient mix if the culture is in powder form. The amount may vary depending on the concentration of the culture.

In another embodiment of the invention the culture is added in an amount of 1-4 wt. %, more preferably 1.5-2.5 wt. %, to the grain based ingredient mix if the culture is in liquid format. The amount may vary depending on the concentration of the culture.

Preferably, the nut and/or seed based mix is pasteurized, homogenized and optionally aged. The combined grain based ingredient mix and the nut and/or seed based ingredient mix may be sweetened and optionally flavoured before the freezing thereof.

In this context, sweeteners include, but not limited to agave syrup, fruit syrups, honey, molasses, rice syrups, corn syrup, tapioca syrup, yam syrup, sucrose, fructose, glucose.

Preferably, the frozen confectionery product has a solid content of 35-45 wt. % solids. This level of solids provides a smooth, creamy, and indulging frozen confectionery body and texture.

Advantageously, the grain in the grain based ingredient mix is selected from the group consisting of grain, cereal, pulse or a combination thereof.

More particular the grain is preferably selected from the group consisting of oat, rice, wheat, barley, corn (maize), millet, sorghum, and rye or a combination thereof.

In a particular preferred embodiment of the invention the grain is oat.

Pulses may also be used in the grain based ingredient mix. The pulses are preferably selected from the group consisting of mung bean, pea, lentils or a combination thereof.

In a preferred method according to the invention the grain based ingredient mix comprises 3-20 wt. %, preferably 8-15 wt. % of grain material based on the weight of the grain based ingredient mix.

The nut and/or seed based ingredient mix may comprise any kind of nuts and/or seed suitable for frozen confectionery. Preferred nut and/or seed is selected from the group consisting of coconut, peanuts, almonds, brazil nuts, cashews, hazel nuts, pecans, walnuts, macadamia nuts, pistachio, chest nuts, other culinary nuts, sunflower, cooconut, pumpkin seeds, sesame, pine nuts, and mixtures thereof.

The nuts and/or seeds are preferably ground to release the oil therein.

For example, cashew cream is prepared by meshing the whole cashew edible parts into butter or cream form. When coconut is used, it is preferably the coconut cream which is added to the frozen confectionery. Coconut cream contains about 24% fat and other coconut edible components.

In a preferred method according to the invention the nut and/or seed based ingredient mix comprises 5-70 wt. %, preferably 4-40 wt. %, more preferably 8-35 wt. % nut and/or seed based on the weight of the nut and/or seed based ingredient mix.

The grain based ingredient mix may comprise 1-30, preferably 15-25 wt. % syrup, resulting a final level of sugar between 6-16 wt. %.

The method according to the invention makes use of plant syrup. Preferably, the plant syrup, is selected from the group consisting of corn syrup, tapioca syrup, agave syrup, rice syrup, brown rice syrup, oat syrup, honey, maple syrup, birch syrup, molasses, fruit syrups, barley syrups, chocolate syrup, yacon syrup, yam syrup, sorghum syrup, cane syrup or a combination thereof.

The syrups mentioned above contains both simple sugar for flavouring purpose, but might also contain long chain polysaccharides to provide the smooth body of ice cream.

The pasteurization of the ingredient mixes may be at a temperature of 63°-100° C. for a period of 0.25-3 min.

The frozen confectionery may comprise 0-20 wt. %, preferably 2-15 wt. % of vegetable oil, such as palm oil, canola oil, coconut oil, cocoa butter, or as combination thereof based on the total weight of the frozen confectionery product.

The frozen confectionery product may also comprise 0-3 wt. %, preferably 0.1-2% wt. % stabilizer, and/or 0-3 wt. %, preferably 0.1-1% wt. % emulsifier.

The ingredient mixes may be frozen while aerating the mix preferably to an overrun of at least 20%, preferably 30% -120%, most preferably 30%-40% or 100% and 120% to form the aerated frozen confection product, and optionally hardened.

In a preferred embodiment of the method of the invention, the method does not comprise a hydrolysing step. A chemical hydrolysing step typically may require adding acid or other chemicals into the process.

Enzymatic hydrolysing step usually involve enzymes such as α-amylase into the process to break down starches, for optimal enzyme performance, conditions such as pH and temperature usually has to be adjusted. Besides, additional heating step usually are required to deactivate the enzymes in the product.

Optionally, but not necessarily, the grain based ingredient mix may be subjected to an enzymatic treatment. In a preferred embodiment of the invention no enzymatic treatment of the plant material takes place.

The ingredient mixes used in the method of the invention may comprise an emulsifier, preferably at least one natural emulsifier.

Natural emulsifiers include for example egg yolk, buttermilk, raw or processed acacia gum, lecithin (soy, sunflower, safflower or other plant derived lecithin), natural plant extracts, rice bran extract or mixtures thereof. The natural emulsifiers have the advantage of conferring to the finished product a smoother texture and stiffer body which reduces the whipping time. The presence of natural emulsifiers results in air cells that are smaller and more evenly distributed throughout the internal structure of the ice cream. Preferably, the natural emulsifier used in the ingredient mix is egg yolk.

It is preferred that the nuts are selected from the group consisting of culinary nuts such as peanuts, almonds, brazil nuts, cashews, hazelnuts, pecans, walnuts, macadamia nuts, pistachio nuts, chestnuts, and mixtures thereof.

Examples of non-natural ingredients which are avoided in this particular embodiment of the invention include for example mono- and diglycerides of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acids, sucrose esters of fatty acids, polyglycerol esters of fatty acids, polyglycerol polyricinoleate, polyethylene sorbitan mono-oleate, polysorbate 80, chemically extracted lecithin.

Chemically modified starches, which are used in the art as stabilisers are also preferably avoided. These include for example oxidised starch, monostarch phosphate, distarch phosphate, phosphated or acetylated distarch phosphate, acetylated starch, acetylated distarch afipate, hydroxy propyl starch, hydroxypropyl distarch phosphate, acetylated oxidised starch.

The ingredient mix used in the method according to the invention is preferably essentially free of the preceding synthetic esters and modified starches. "Essentially free" means that these materials are not intentionally added for their conventional property imparting abilities, e.g. stabilizing, although there could be unintended minor amounts present without detracting from the performance of the products. Generally and preferably, the products of the invention will not contain any non-natural materials.

The ingredient mix may also be free of the above mentioned emulsifiers and comprise only egg yolk for emulsification.

The ingredient mix may comprises 0-3 wt. %, preferably 0.1-2 wt. % stabilizer.

The ingredient mix may further comprise flavours, colourings, water, fruit and cocoa preparations and/or commonly used ice cream inclusion components.

For the making of frozen confection, the ingredient mix may be frozen while optionally aerating the mix preferably to an overrun of at least 20%, preferably 30%-120%, most preferably 30%-40% or 100% and 120% to form an aerated frozen confection product, and optionally hardened.

In the making of frozen confection, the product is optionally subjecting subject to a dynamic cooling at a temperature below −11° C. in a single or twin extruder.

FIG. 1 shows a process diagram for a preferred the method of producing frozen confection. An ingredient mix of cashew cream, tapioca syrup DE 27, sucrose liquid, water, pectin, and soluble rice fiber is to a blend tank where the ingredient mix is homogenized in a two stage homogenizer at 1500+500 psi respectively (2000 psi total).

In the method in FIG. 1, the ingredient mix is then pasteurized at 82.2° C. (180° F.) for 90 seconds.

The ingredient mix is then cooled to a temperature below 7.2° C. (45° F.). A pasteurized sucrose solution is then added and the mix of the other ingredients in a mix tank. The ingredient mix is then stored at a temperature below 7.2° C. (45° F.) for up to 72 hours.

EXAMPLES

By way of example and not limitation, the following examples are illustrative of various embodiments of the present invention.

Example 1

Methodology and Trials
NCC Strain Selection
Off-Flavor Reduction

Both volatile and non-volatile targets were considered for the reduction of off-flavors which are inherent in oat-based matrices.

Enhance Creamy Mouthfeel

Volatile and non-volatile compounds associated with creamy mouthfeel and texture were targeted.

Shake Flask Fermentation Trials

Screening trials were conducted with commercially purchased oat drink (Lima food, Groendreef, Aalter). Following strain activation and two passages of pre-culturing with the optimum culture media, the selected NCC strains were inoculated (2%) into oat milk and incubated at the optimum growth temperature for 24 hours. pHs of the oat milk before and after fermentation were recorded. Thereafter, the fermented oat milks (80° C., 5 min) were pasteurized and a technical evaluation (texture, aroma) of the fermentation impacts was conducted. The NCC strains which conferred a sensory impact were selected for up-scaled trials.

Up-Scaled Fermentation Trials

Fermentation trials at 100 gallon scale were conducted with the selected NCC strains using the following recipe (see Table 1). The fermentation medium consisted of reconstituted organic whole oat flour (Richardson Milling) with glucose corn syrup at 20-40% total solids (TS). FIG. 1 depicts the frozen confectionery production process (coconut variant). The fermentation mix was first pasteurized prior to strain inoculation (2%). pH measurements and fermented oat samples were taken at different time points (before inoculation, t=0, 6, 11 and 24 h) for analytics to evaluate fermentation impacts. Subsequently, the fermented oat mix was cooled prior to a formulation step where the remaining ingredients were introduced. Sensory evaluation of the fermented samples was conducted with an ice cream expert panel.

TABLE 1

Recipe for frozen dessert production

| | Ingredient | Cashew cream recipe lb |
|---|---|---|
| Non-fermented part | Water | 21.297 |
| | sugar cane crystals | 4.660 |
| | glucose corn syrup 36-43 DE | 17.300 |
| | Pectin | 0.248 |
| | Cashew cream | 9.000 |
| | Organic soluble rice fiber | 0.200 |
| Fermented oat liquid | Water Potable 7.5 pH Bulk-oat | 33.795 |
| | Glucose corn syrup 36-43 DE | 9.000 |
| | Organic Oat flour | 4.500 |
| Variegate recipe | Organic Agave syrup | 5.000 |
| | Raspberry variegate | 5.64 |
| | Vanilla flavor | 0.23 |
| | Total | 110.870 |

FIG. 1. Process chart for oat fermentation and ice cream production

Volatile Analytics of Fermented Oat Samples

Volatile profiles of the fermented oat samples were analyzed with headspace-solidphase microextraction-gas chromatography-mass spectrometry (HS-SPME-GC-MS).

Results

1. NCC Strain Selection

Table 1 shows the list of NCC strains selected for screening trials using the selected criteria. A total of 13 strains were selected for screening trials.

TABLE 1

List of NCC strains selected based on defined criteria

| Goal | Criteria | Strains |
| --- | --- | --- |
| Increased creaminess | EPS production | L. delbrueckii subsp. bulgaricus NCC 15 |
| | | L. delbrueckii subsp. bulgaricus NCC 526 |
| | | L. delbrueckii subsp. bulgaricus NCC 2810 |
| | | L. delbrueckii subsp. lactis NCC 2812 |
| | | S. macedonicus NCC 2437 |
| | Lactones production | L. lactis subsp. cremoris NCC 1864 |
| | | S. thermophilus NCC 2019 |
| | | S. thermophilus NCC 2496 |
| Reduced off-flavour | Saponins degradation | L. acidophilus NCC 90 |
| | | L. lactis NCC 2415 |
| | | L. lactis NCC 2930 |
| | | L. plantarum NCC 1385 |
| | Aldehyde metabolism | B. animalis subsp. lactis NCC 2818 |

*L. delbrueckii* subsp. *bulgaricus* I-1198, also named NCC 15 was deposited with the Collection Nationale de Cultures de Microorganismes (CNCM), Institut Pasteur, 25 rue du Docteur Roux, F-75724 PARIS Cedex 15, France, on 2 Apr. 1992 and given the deposit number I-1198.

*L. delbrueckii* subsp. *bulgaricus* I-3600, also named NCC 526 was deposited with the Collection Nationale de Cultures de Microorganismes (CNCM), Institut Pasteur, 25 rue du Docteur Roux, F-75724 PARIS Cedex 15, France, on 20 Apr. 2006 and given the deposit number I-3600.

*L. delbrueckii* subsp. *bulgaricus* NCIMB 702006, also named NCC 2810 is available to purchase from NCIMB Ltd, Aberdeen, UK.

*L. delbrueckii* subsp. *lactis* NCIMB 700860, also named NCC 2812 is available to purchase from NCIMB Ltd, Aberdeen, UK.

*S. macedonicus* CNCM I-1925, also named NCC 2437 was deposited with the Collection Nationale de Cultures de Microorganismes (CNCM), Institut Pasteur, 25 rue du Docteur Roux, F-75724 PARIS Cedex 15, France, on 14 Oct. 1997 and given the deposit number I-1925.

*L. lactis* subsp. *cremoris* CNCM I-369, also named NCC 1864 was deposited with the Collection Nationale de Cultures de Microorganismes (CNCM), Institut Pasteur, 25 rue du Docteur Roux, F-75724 PARIS Cedex 15, France, on 21 Nov. 1984 and given the deposit number I-369.

*L. acidophilus* CNCM I-2332, also named NCC 90 was deposited with the Collection Nationale de Cultures de Microorganismes (CNCM), Institut Pasteur, 25 rue du Docteur Roux, F-75724 PARIS Cedex 15, France, on 12 Oct. 1999 and given the deposit number I-2332.

*L. lactis* CNCM I-1962, also named NCC 2415 was deposited with the Collection Nationale de Cultures de Microorganismes (CNCM), Institut Pasteur, 25 rue du Docteur Roux, F-75724 PARIS Cedex 15, France, on 19 Dec. 1997 and given the deposit number I-1962.

*L. lactis* CNCM I-4404, also named NCC 2930 was deposited with the Collection Nationale de Cultures de Microorganismes (CNCM), Institut Pasteur, 25 rue du Docteur Roux, F-75724 PARIS Cedex 15, France, on 25 Nov. 2010 and given the deposit number I-4404.

*L. plantarum* CNCM I-4635, also named NCC 1385 was deposited with the Collection Nationale de Cultures de Microorganismes (CNCM), Institut Pasteur, 25 rue du Docteur Roux, F-75724 PARIS Cedex 15, France, on 29 May 2012 and given the deposit number I-4635.

*B. animalis* subsp. *lactis* CNCM I-3446, also named NCC 2818 was deposited with the Collection Nationale de Cultures de Microorganismes (CNCM), Institut Pasteur, 25 rue du Docteur Roux, F-75724 PARIS Cedex 15, France, on 7 Jun. 2005 and given the deposit number I-3446.

2. Results from Shake-Flask Trials

The pH of the commercial oat milk prior to inoculation is 7.73. Table 2 shows the pH of oat milks after fermentation at t=24 h.

TABLE 2 pH changes after fermentation at t = 24 h

| NCC strain | pH (t = 24 h) |
| --- | --- |
| 15 | 5.94 |
| 526 | 7.41 |
| 2810 | 7.41 |
| 2812 | 7.29 |
| 2437 | 4.58 |
| 1864 | 5.85 |
| 2019 | 4.40 |
| 2496 | 4.60 |
| 90 | 6.59 |
| 2415 | 5.57 |
| 2930 | 6.04 |
| 1385 | 5.91 |
| 2818 | 5.94 |

In addition to the acidification (pH decrease) observed after fermentation, buttery attributes, at different extent, were also perceived from sniffing trials with the oat milks fermented with NCC 2019 and 2496 against the control. Thus, these strains were further selected for large scale trials to evaluate the sensory impact after oat fermentation and in the final frozen dessert product.

3. Upscaled Fermentation Trials

Figure 2:
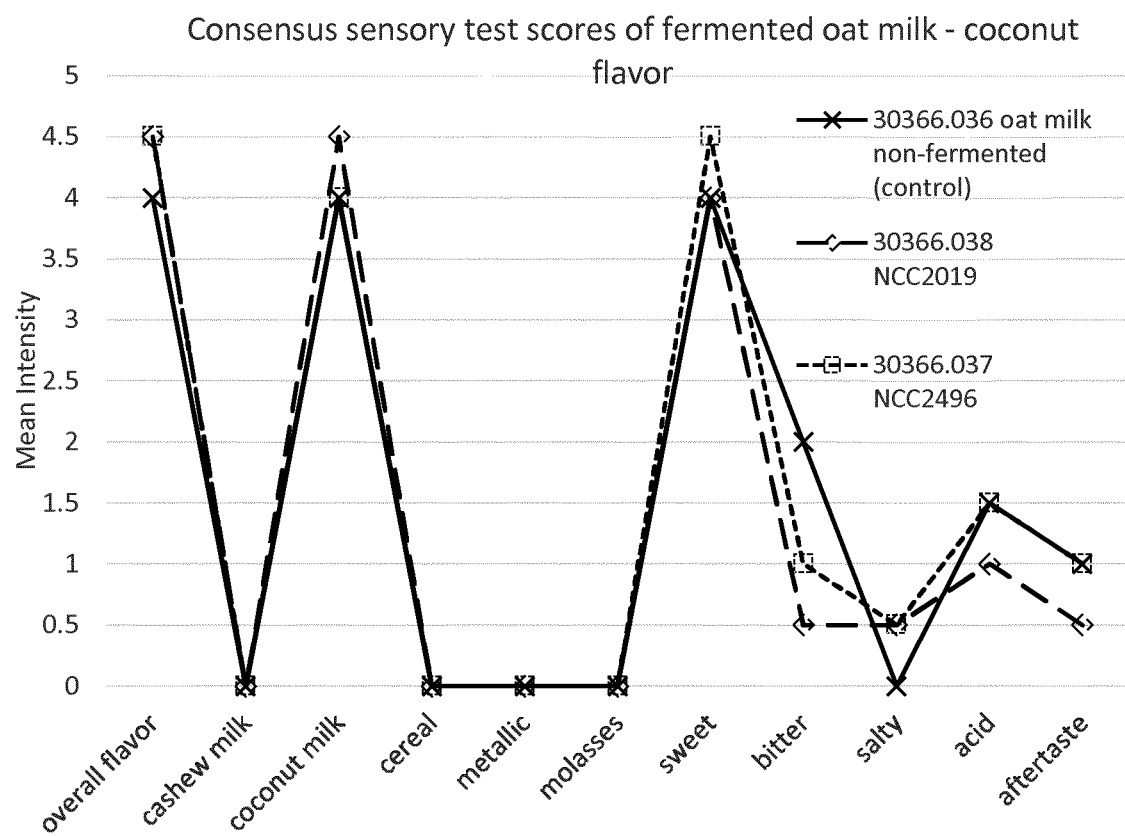
FIG. 2 is a chart showing consensus sensory scores of non-fermented oat compared with fermented oat milk with *Streptococcus thermophilus* according to the invention.

Preliminary large scale trials were conducted to evaluate the sensory impact after fermentation as well as in the final recipe so as to determine the strain to use. FIG. 2 shows the sensory evaluation results from the expert panel tasting of frozen desserts produced with fermented (NCC 2496 & 2019) and non-fermented commercial aseptic oat milk (Pacific original flavor).

For the fermented mix stream, commercial aseptic packaged oat milk was incubated with NCC15, NCC2019, or NCC2496 at temperature of 37° C. for NCC15 and 40° C. for NCC2019 and NCC2496. Fermentation of oat milk and culture were performed in constant temperature hotbox with air circulation. The ending pH or each culture is as follows:

TABLE 3 pH changes after fermentation at T = 24 h

| NCC strain | pH (t = 24 h) | Measuring temperature ° C. |
|---|---|---|
| 15 | 5.89 | 15.6 |
| 2019 | 4.34 | 15.1 |
| 2496 | 4.39 | 16.8 |

For the non-fermented batching of cashew cream mix, cream with water, sweetener, stabilizer, syrups were batched. All ingredients, followed by microthermic pasteurization (UHT at 182° F. (83.3° C.) for 90 second) and KF-80 freezer process (draw temperature at 21° F. (-6.1° C.), overrun of 40 were used to make frozen desserts. Mix making were performed on day 1 and followed by mixing with fermented oat liquid, flavoring and freezing of samples on day two, aging of ice cream mix were performed overnight in between these two days at 40° F. (4.4° C.).

Due to the high pH of culture NCC 15, NCC 2019 and NCC 2496 have been selected to move forward with consensus sensory test with 6 trained sensory panelists.

Sensory Methodology:

Consensus profiling by using the 0 to 10 scale.

Product Conditions:

Product tempered at 0° F. (−17.7° C.) for 24 hours before serving. Serving temperature was at 6° F. (−14.4° C.).

FIG. 2. Comparison of sensory profiles with frozen desserts made of fermented vs. non-fermented oat milk in coconut cream recipe. It was observed that NCC 2019 increased the intensity of coconut milk attributes, suggesting an increase in the extent of creaminess while NCC 2496 increased the sweet attribute of the final product. The decision was made to proceed with in-depth trials with NCC 2019 based on the overall flavor profile.

In the subsequent trials, the sensory impact induced with NCC 2019 were correlated with volatile, non-volatile analytics and pH changes (FIG. 3) by sampling at different time points. In addition, the ideal aim was to determine an optimum fermentation time, preferably below 24 hours.

Figure 3:
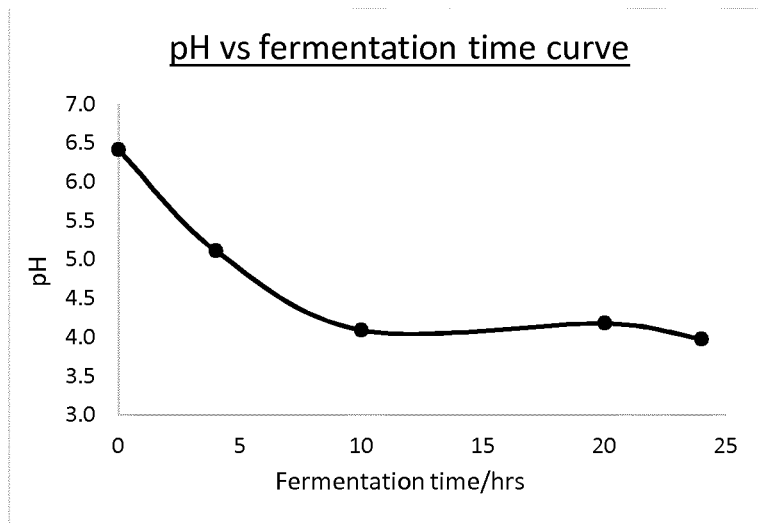
FIG. 3 is a chart showing pH values for increased fermentation time.

FIG. 3. pH changes (NCC 2019) against fermentation time. FIG. 3 shows that the pH was approximately 4 after 24h fermentation. More importantly, it was noted that 11h was already sufficient for acidification to pH 4. This seemed to be correlated with the tasting results from the ice cream expert panel, which revealed a reduction of cereal off-taste with NCC 2019 after 11 and 24 hours.

Figure 4:
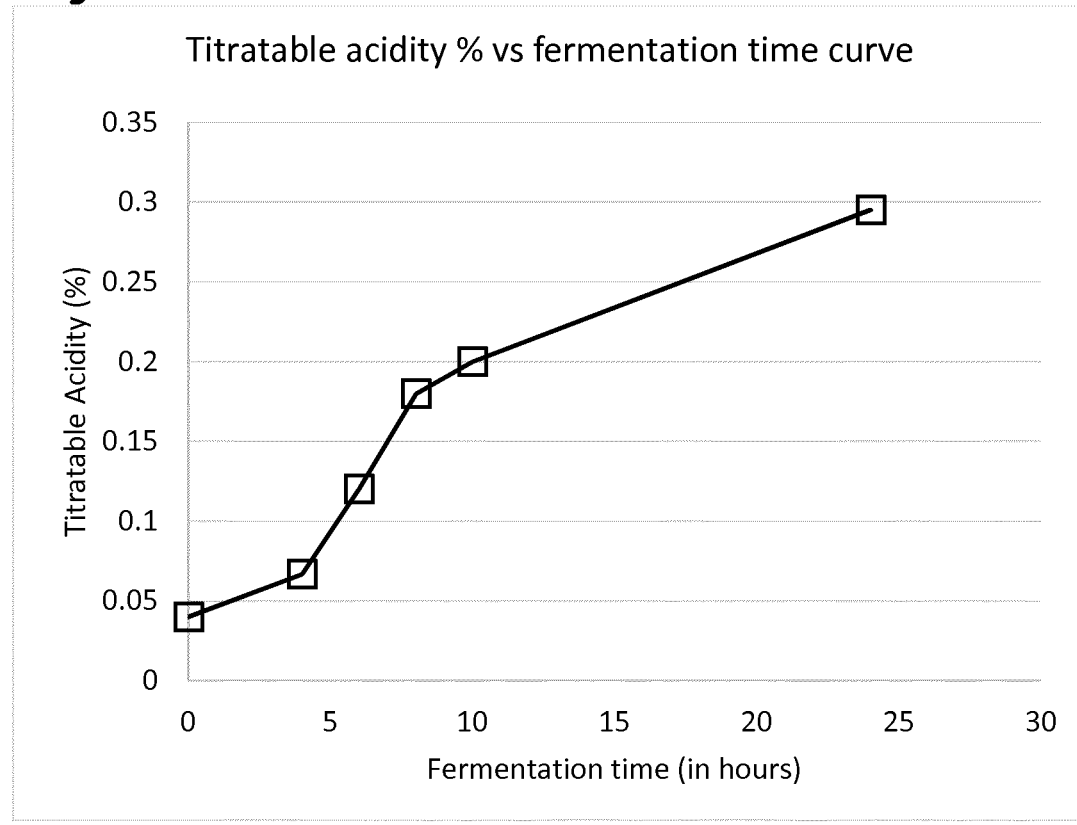
FIG. 4 is a chart showing titratable acidity values compared for increased fermentation time.

FIG. 4. Titratable acidity % (NCC 2019) against fermentation time. FIG. 4 shows that titratable acidity (TA) % was around 0.2 at 11 hours, and 0.3 at 24 hours. The increasing rate of TA% significantly slowed down after 11 hours. Which support the decreasing growth rate of microorganisms.

Figure 5:
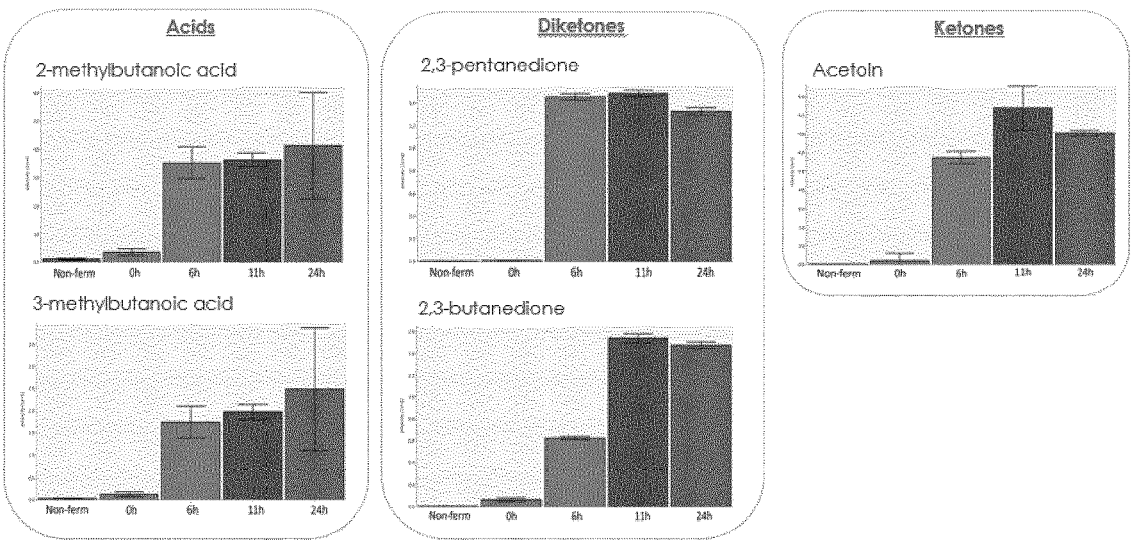
FIG. 5 shows volatilities associated with creaminess of fermented oat based ingredient mix fermentation with NCC 2019.

In addition, volatiles analytics corroborate with these results. FIG. 5 shows that oat fermentation with NCC 2019 increase the levels of classes of compounds such as methyl acids, diketones and ketones, which are associated with creamy mouthfeel. These results could explain the increase in creaminess attributes observed in FIG. 5. In parallel, this increase in creaminess could have a masking effect, leading to a decrease in the cereal off-taste perceived by the expert panel. Another interesting observation was that the levels of these classes of volatile compounds at t=11 h and 24 h were relatively similar. Therefore, based on volatile analytics, fermentation and sensory data, it could be concluded that the optimal fermentation time for flavor optimization of oat flour is 11 h.

Screening of Anti-Gelling Solutions In fermented mix, high viscosity due to starch-rich materials from grain is constantly causing difficulties in process. To screen the feasible solutions to lower the viscosity of mix, whole oat flour supplied by Richardson Milling was mixed at different levels of water and glucose/glucose syrup DE 36 to learn the viscosity changes at temperature close to pasteurization condition by using Kettle heating equipment with constant hand mixing.

Figure 6:
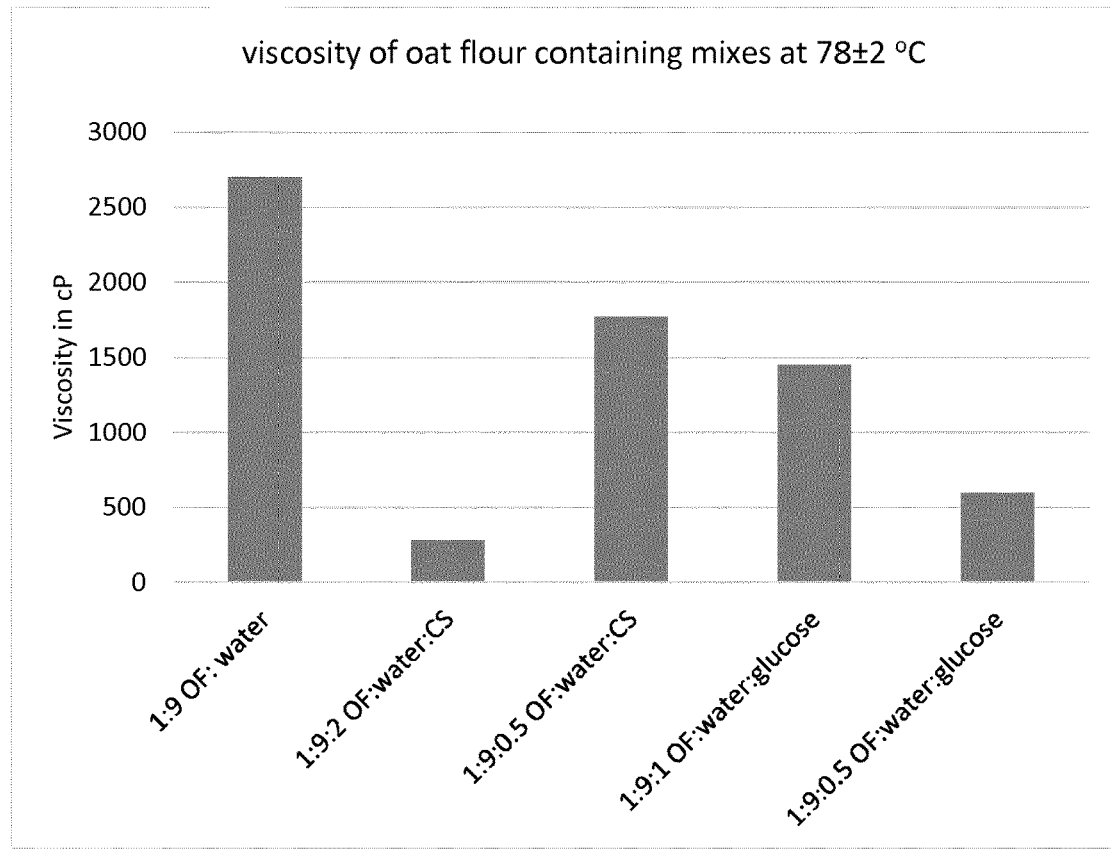
FIG. 6 is a chart showing the viscosity of same oat flour mixed with different percentage of water and glucose syrup or glucose at temperature of $78\pm2°$ C.

FIG. 6 is a chart showing the viscosity of same oat flour mixed with different percentage of water and glucose syrup or glucose at temperature of 78±2° C. Viscosity of oat containing mixes were measured by Brookfield LV Viscometer.

The original results are in table 4.

TABLE 4

Viscosity of different oat flour mix at 78 ± 2° C. by Brookfield LV viscometer

| | CP viscosity | % | Temp | RPM | Spindle Size |
|---|---|---|---|---|---|
| 1:9 OF$^a$:water | 2699 | 67.3% | 79.9° C. | 30 | 3 |
| 1:9:2 OF$^a$:water:CS$^b$ | 277.9 | 27.8% | 76.9° C. | 30 | S62 |
| 1:9:0.5 OF$^a$:water:CS$^b$ | 1772 | 44.2% | 78.2° C. | 30 | 3 |
| 1:9:1 OF$^a$:water:glucose | 1452 | 36.3% | 77.6° C. | 30 | 3 |
| 1:9:0.5 OF$^a$:water:glucose | 593.9 | 59.4% | 77.2° C. | 30 | S62 |

$^a$OF stands for "Oat flour"
$^b$GS stands for "corn syrup 36 DE"

The figure shows 1:9 ratio of oat flour to water has the highest viscosity, where oat flour mixed with water and corn syrup at 1:9:2 has the most promising low viscosity results. Glucose syrup can also decrease the mix viscosity in the levels we used.

Impact of Fermentation of Final Product Texture

To understand the impact of fermentation by culture NCC 2019 on product texture, consensus profiling sensory test (scale 0 to 10) has been used again with 7 trained sensory panelists. Product were tempered at 0° F. for 24 hours before serving. Samples were served at temperature of 6° F.

Figure 7:
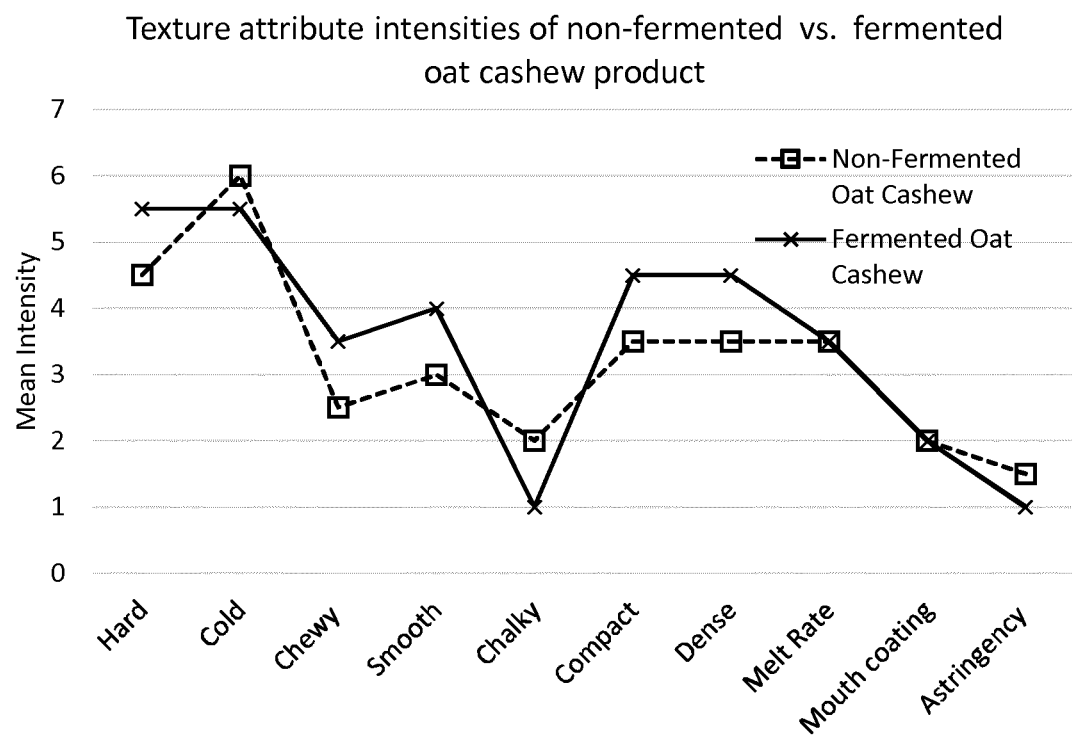
FIG. 7 is a chart showing product texture sensory scores of non-fermented oat compared with fermented oat with *Streptococcus thermophilus* according to the invention.

FIG. 7 is a chart showing product texture sensory scores of non-fermented oat compared with fermented oat with *Streptococcus thermophilus* according to the invention.

Texture attribute intensities of non-fermented vs. fermented oat flour cashew flavor product in 100 gallon production is shown.

The sensory test result shows fermentation by culture NCC 2019 increases the perception of chewiness and smoothness and decreases chalky texture in the cashew base frozen desserts.

Conclusions

Mid- and large-scale fermentation trials, concluded that NCC 2019 was capable of enhancing creaminess, decrease cereal off-taste, in the final product and volatile analytical data corroborated with these sensory results. In addition, it was found that 11 h, as opposed to 24 h, may be optimal fermentation time for flavor optimization of oat flour.

To improve the processability, syrup or sugars can be used as anti-gelling agents to decrease the high viscosity caused by grain-rich materials.

Fermentation by NCC 2019 can and increases the perception of chewiness and smoothness and decreases chalky texture in the cashew base frozen desserts.

Example 2

Mix Making (1)
Oat Liquid Recipe

| Name | Quantity (lb) |
| --- | --- |
| Water | 70 |
| Glucose corn syrup/Tapioca Syrup 20-40 DE | 20 |
| Organic oat flour | 10 |
| Total | 100 |

Orders of Addition:

water (ambient temperature), Glucose corn syrup/tapioca syrup, oat flour.

Based on previous study, glucose/tapioca syrups was selected as the best anti-gelling agent (compared to dextrose, sucrose) to reduce the viscosity from oat flour during pasteurization process. It can also be used as nutrients for strain to grow during fermentation process.

The ratio of 1:7:2 of whole oat flour:water:syrup was selected, based on previous study, to have viscosity within the capacity of HIST/UHT, while not compromising the total solids content in the product.

Pasteurization (2)

No homogenization was used due to low fat contents of oat flour (1% or less) and high viscosity caused by starch/beta-glucan from oat flour itself.

Pasteurization temperature at 180° F. was held for 30-90 seconds, then cooled to 110-104° F. to prepare the material at target fermentation temperature.

Cultures (3)

Strain NCC2019 was selected from a culture collection and was found to mask the off-taste from plant material, while enhancing the creaminess by producing compounds like lactone.

Strains were prepared by two passage incubations, each passage has a 24h period starting from a liquid stock culture, and the inoculation size was 2% for each stage.

Recipe for ST496 Media

| Name | Quantity (lb) |
| --- | --- |
| Polyoxyethylene Sorbitan Mono | 0.10 |
| Yeast Extract Powder | 2.50 |
| Dextrose Monohydrate Powder | 0.50 |
| Lactose Edible | 5.00 |
| Water | 91.90 |
| Total | 100.00 |

More study and research are on-going to understand the mechanism of the strain used.

Currently the stain is propagated in media ST496 (recipe attached), strains in dry powder.

Fermentation (4)
Recipe Fermented Oat Flour Liquid

| Name | Quantity (lb) |
| --- | --- |
| culture | 0.04 |
| Oat flour liquid from step 1 | 99.96 |
| Total | 100 |

After adding the strain into the oat liquid, materials were mixed well, then held in jacket yogurt tank at constant temperature of 104° F. for 4-24 hours.

Cooling (5)

After fermentation, materials were fast cooled down through a cooler from 104° F.-40° F., then transferred to flavour tank for mixing with non-fermented mix (coconut cream mix or cashew cream mix), flavours, or agaves.

Cashew Cream Mix (6)
Recipe

| Name | Quantity (lb) |
| --- | --- |
| Pectin High Ester ED 58-62% | 0.451 |
| Glucose corn syrup/tapioca syrup 36DE | 31.455 |
| Sucrose liquid 67 Brix | 12.645 |
| soluble rice fiber | 0.364 |
| Water | 38.722 |
| Cashew Cream | 16.346 |
| Total | 100 |

Orders of Addition:

Water (ambient temperature), glucose syrup/tapioca syrup, sucrose liquid, pectin, soluble rice fiber, cashew cream.

Soluble rice fibre (RiSoluble)is a clean label stabilizer extracted from rice bran and supplied by the company called Rice Bran Technologies.

Syrups were added to water to help with the dispersion of stabilizers and oat flour.

Cashew cream is used as a fat source in this recipe to enhance the creaminess. As hydrocolloids, proteins from cashew cream can also act as stabilizer to bind water in the finished product to reduce iciness.

Coconut Cream Mix (7)
Recipe

| Name | Quantity (lb) |
| --- | --- |
| Pectin High Ester ED 58-62% | 0.413 |
| Glucose corn syrup/tapioca syrup 27-36DE | 30.500 |
| Sucrose liquid 67 Brix | 11.592 |
| Fiber Soluble Rice | 0.333 |
| Water | 5.778 |
| Coconut cream 24% fat | 51.383 |
| Total | 100 |

Orders of Addition:

Water (ambient temperature), glucose syrup/tapioca syrup, sucrose liquid, pectin, soluble rice fiber, coconut cream.

Coconut cream is used as a fat source in this recipe, not like coconut oil which crystalize at high temperature and causing phase separation. The colloidal structure of fat in coconut cream can be well mixed with other compounds in the products.

Pasteurization & Homogenization (8)

Pasteurization condition was carried out at 180 +/−2° F., holding time changed from 90 to 30 seconds due to the concern of high viscosity from proteins and starches from cashew cream.

Homogenization was carried out by 2 stage method, 1500 PSI/500PSI.

Aging (9)

Aging was used to enhance fat crystallization and build the fat network structure in the final product. Aging was carried out at 40° F. for 1 day before mixing with fermented oat liquid.

Mix and Flavour (10)

Recipe for Coconut Mix

| Name | Quantity (lb) |
| --- | --- |
| Fermented oat liquid | 57.018 |
| Organic Agave syrup 75 brix | 4.751 |
| Coconut cream mix | 38.012 |
| Vanilla flavour | 0.219 |
| Total | 100 |

Recipe for Cashew Mix

| Name | Quantity (lb) |
| --- | --- |
| Fermented oat liquid | 52.266 |
| Organic Agave syrup 75 brix | 4.751 |
| Cashew cream mix | 42.763 |
| Vanilla flavour | 0.219 |
| Total | 100 |

Agave syrup and vanilla were added in this step to retain the freshness of the volatile compounds.

Freezing (12)

Freezing was carried out at 21-22° F.

Freezing with fruits (pineapple crush/raspberry variegates) were added as inclusion during freezing as while, to enhance the overall flavour.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of producing a non-dairy frozen confectionery, the method comprising:
   1) providing a grain based ingredient mix comprising plant syrup and having 20-40 wt. % solids,
   pasteurizing the grain based ingredient mix,
   fermenting the pasteurized grain based mix with a culture that is *Streptococcus thermophilus* selected from the group consisting of *Streptococcus thermophilus* NCC 2019: CNCM I-1422 and *Streptococcus thermophilus* NCC 2496: CNCM I-3915, and
   cooling the fermented grain based ingredient mix;
   2) providing a nut and/or seed based ingredient mix comprising 40-60 wt. % solids,
   wherein at least one nut and/or seed in the nut and/or seed based ingredient mix is selected from the group consisting peanuts, almonds, brazil nuts, cashews, hazelnuts, pecans, walnuts, macadamia nuts, pistachio, chestnuts, sunflower, and mixtures thereof; and
   3) combining the nut and/or seed based ingredient mix with the cooled fermented grain based ingredient mix, and freezing to form the non-dairy frozen confectionery.

2. The method according to claim 1, wherein the nut and/or seed based mix is pasteurized.

3. The method according to claim 1, wherein the combined grain based ingredient mix and the nut and/or seed based ingredient mix is sweetened before the freezing thereof.

4. The method according to claim 1, wherein the non-dairy frozen confectionery product has a solid content of 35-45 wt. % solids.

5. The method according to claim 1, wherein grain in the grain based ingredient mix is selected from the group consisting of grain, cereal, pulse and a combination thereof.

6. The method according to claim 1, wherein grain in the grain based ingredient mix is selected from the group consisting of oat, rice, wheat, barley, corn, millet, sorghum, and rye and a combination thereof.

7. The method according to claim 5, wherein the pulses are selected from the group consisting of mung bean, pea, lentils and a combination thereof.

8. The method according to claim 1, wherein the grain based ingredient mix comprises 3-20 wt. %, of grain material based on the weight of the grain based ingredient mix.

9. The method according to claim 1, wherein the nut and/or seed based ingredient mix is not fermented.

10. The method according to claim 1, wherein the nut and/or seed based ingredient mix comprises 5-70 wt. % of the at least one nut and/or seed based on the weight of the nut and/or seed based ingredient mix.

11. The method according to claim 1, wherein the grain based ingredient mix comprises 5-30 wt. % of the plant syrup.

12. The method according to claim 1, wherein the plant syrup is selected from the group consisting of syrup from tapioca, corn, sweet potato, yam, potato, rice, brown rice, barley, oat, birch, fruits, chocolate, yacon, sorghum, cane and combinations thereof.

13. The method according to claim 1, wherein the pasteurization of the grain based ingredient mix is at a temperature of 63°-100° C. for a period of 0.25-3 min.

14. The method according to claim 1, wherein the nut and/or seed based ingredient mix comprises 0-20 wt. % of vegetable oil based in the weight of the nut and/or seed based ingredient mix.

15. The method according to claim 1, wherein the non-dairy frozen confectionery product comprises 0-3 wt. % stabilizer.

16. The method according to claim 1, wherein the combined grain based ingredient mix and the nut and/or seed based ingredient mix is frozen while aerating the combined grain based ingredient mix and the nut and/or seed based ingredient mix.

17. A frozen confectionery according to the method of claim 1.

18. A non-dairy frozen confectionery comprising:
   3-20 wt. % grain fermented with *Streptococcus thermophilus* selected from the group consisting of *Streptococcus thermophilus* NCC 2019: CNCM I-1422 and *Streptococcus thermophilus* NCC 2496: CNCM I-3915, and
   4-40 wt. % seed and/or nuts selected from the group consisting peanuts, almonds, brazil nuts, cashews, hazelnuts, pecans, walnuts, macadamia nuts, pistachio, chestnuts, sunflower, and mixtures thereof.

* * * * *